(12) United States Patent
Hu et al.

(10) Patent No.: US 11,615,130 B1
(45) Date of Patent: Mar. 28, 2023

(54) CORE DATA-BASED STORAGE METHOD FOR RADIAL MULTIDIMENSIONAL DOCUMENTS

(71) Applicants: STATE GRID ZHEJIANG ELECTRIC POWER CO., LTD, Zhejiang (CN); MARKETING SERVICE CENTER OF STATE GRID ZHEJIANG ELECTRIC POWER CO., LTD, Zhejiang (CN)

(72) Inventors: Ruoyun Hu, Zhejiang (CN); Huadong Qiu, Zhejiang (CN); Wenqi He, Zhejiang (CN); Liang Ma, Zhejiang (CN); Yongjia Zhou, Zhejiang (CN); Weihao Qiu, Zhejiang (CN); Gang Sun, Zhejiang (CN); Qi Ding, Zhejiang (CN); Qingjuan Wang, Zhejiang (CN); Suying Hou, Zhejiang (CN); Yan Zhang, Zhejiang (CN); Lanlan Guo, Zhejiang (CN); Huan Liu, Zhejiang (CN); Xiaohui Xu, Zhejiang (CN); Sheng Ye, Zhejiang (CN)

(73) Assignees: STATE GRID ZHEJIANG ELECTRIC POWER CO., LTD, Zhejiang (CN); MARKETING SERVICE CENTER OF STATE GRID ZHEJIANG ELECTRIC POWER CO., LTD, Zhejiang (CN)

( * ) Notice: Subject to any disclaimer, the term of this patent is extended or adjusted under 35 U.S.C. 154(b) by 0 days.

(21) Appl. No.: 17/967,158

(22) Filed: Oct. 17, 2022

(51) Int. Cl.
*G06F 16/00* (2019.01)
*G06F 16/35* (2019.01)
*G06F 16/383* (2019.01)

(52) U.S. Cl.
CPC .......... *G06F 16/358* (2019.01); *G06F 16/383* (2019.01)

(58) Field of Classification Search
None
See application file for complete search history.

(56) References Cited

U.S. PATENT DOCUMENTS

| 7,992,102 | B1* | 8/2011 | De Angelo | G06F 3/04847 715/834 |
| 2008/0072179 | A1* | 3/2008 | Anwar | G06F 16/951 707/999.005 |
| 2013/0151509 | A1* | 6/2013 | Tran | G06F 16/9577 707/723 |
| 2015/0040052 | A1* | 2/2015 | Noel | G06F 3/04847 715/771 |

\* cited by examiner

*Primary Examiner* — Syed H Hasan
(74) *Attorney, Agent, or Firm* — The PL Law Group, PLLC

(57) ABSTRACT

A core data-based storage method for radial multidimensional documents according to an embodiment includes classifying first documents with same document type information into a preset folder to obtain a classified folder; acquiring the total number of levels of document level information of all non-core documents; and displaying preset target images at core display positions and/or non-core display positions, and setting a corresponding storage link path for each of the displayed preset target images. The documents may be stored by classification and displayed visually.

5 Claims, 2 Drawing Sheets

CORE DATA-BASED STORAGE METHOD FOR RADIAL MULTIDIMENSIONAL DOCUMENTS

CROSS-REFERENCE TO RELATED APPLICATION AND CLAIM OF PRIORITY

This application claims the benefit under 35 USC § 119 of Chinese Patent Application No. 202210843663.4, filed on Jul. 18, 2022, in the China Intellectual Property Office, the entire disclosure of which is incorporated herein by reference for all purposes.

BACKGROUND

1. Field

The present disclosure relates to the technical field of data processing, in particular to a core data-based storage method for radial multidimensional documents.

2. Background Art

In the context of power projects, there are often many contract documents. For example, when a project is signed, it will first include general contract documents, then it will further include a plurality of sub-contract documents correspondingly implementing various aspects of the project in order to implement the content in the general contract documents, and the sub-contract documents further include purchase contracts for purchasing equipment (such as power equipment) required in the project, etc.

In the prior art, a folder will be used to manage a large number of the above-mentioned documents, all related documents are placed into the same folder, and the documents stored in the same folder are generally arranged in sequence according to letters by names of the documents. For example, if there are documents with the following names in the folder: zb, fb, and cg, then the documents are arranged in the above way to obtain the documents cg, fb, and zb. The above method for classifying the documents is based on the document names, which is simple, but when there are many documents in a folder, the documents cannot be visually displayed, and it is relatively time-consuming for users to find the documents, causing the low document calling efficiency.

SUMMARY

In order to overcome the shortcomings in the prior art, the present disclosure provides a core data-based storage method for radial multidimensional documents. The documents may be stored by classification and displayed visually, which improves the document calling efficiency of a user.

To solve the above technical problem, the present disclosure adopts the following technical solution:

An embodiment of the present disclosure provides a core data-based storage method for radial multidimensional documents, including:

S1: acquiring a document dimension tag corresponding to each document, the document dimension tag at least including document type information and document level information;

S2: classifying first documents with the same document type information into a preset folder to obtain a first classified folder, and sorting all the first documents in the first classified folder in descending order according to the document level information to obtain a second classified folder after an update of the first classified folder;

S3: determining at least one core document according to a first one of the first documents in the second classified folder, taking other ones of the first documents in the second classified folder as non-core documents, and acquiring the total number of levels of the document level information of all the non-core documents;

S4: establishing radial multidimensional display graphs corresponding to the second classified folder according to the total number of the levels, placing the core documents in core display positions of the radial multidimensional display graphs, and determining a non-core display position of each of the non-core documents in the radial multidimensional display graphs according to the document level information of the non-core document; and S5: displaying preset target images at the core display positions and/or the non-core display positions, setting a corresponding storage link path for each of the displayed preset target images, and after determining that the preset target images at the core display positions and/or the non-core display positions are triggered, accessing the corresponding target folders on the basis of the storage link paths to call the corresponding first documents.

Further, the S2 includes:
acquiring information of all document types of all documents, and respectively establishing the preset folder corresponding to the information of each document type;

classifying the documents with the document type information corresponding to the preset folder into the preset folder, and obtaining the corresponding first classified folder after determining that all the documents with the same document type information are classified into the preset folder;

acquiring the document level information of all the first documents in the first classified folder; and sorting all the first documents in descending order according to the document level information of the first documents to obtain the second classified folder after the update of the first classified folder.

Further, the S3 includes:
taking the first one of the first documents in the second classified folder as the core document, and taking the document level information corresponding to the core document as highest level information;

taking other ones of the first documents with the same highest level information as the core documents; and taking other ones of the first documents with the level information different from the highest level information as the non-core documents, and performing statistics on the total number of all the document levels of all the non-core documents.

Further, the S4 includes:
when determining that a tree display request is received, establishing the radial multidimensional display graphs, in the form of a tree, corresponding to the total number of the levels;

determining the number of root nodes in the radial multidimensional display graphs according to the number of the core documents, and taking the root nodes as the core display positions;

determining the number of sub-nodes of each level in the corresponding multidimensional display graph according to the number of the non-core documents with the document level information, and taking the sub-nodes as the display positions of the non-core documents; and connecting all the root nodes to the corresponding sub-nodes, and connecting the sub-nodes of a different level to the sub-nodes of an adjacent level, the levels of the sub-nodes corresponding to the document level information.

Further, the connecting all the root nodes to the corresponding sub-nodes, and connecting the sub-nodes of a different level to the sub-nodes of an adjacent level, the levels of the sub-nodes corresponding to the document level information, includes:

acquiring the length and width of the radial multidimensional display graphs, and obtaining the display length and display width of the radial multidimensional display graphs according to the reserved edge length and the reserved edge width;

dividing the display length by the total number of the levels to obtain a length interval distance, and controlling the nodes of the adjacent level to be spaced according to the length interval distance in a length direction;

performing statistics on the number of the nodes corresponding to each level to obtain the total number of the nodes, dividing the display width by the number of the nodes to obtain a width interval distance, and controlling the adjacent nodes of the same level to be spaced according to the width interval distance; and connecting the root nodes to the corresponding sub-nodes, and connecting the sub-nodes of the different level to the sub-nodes of the adjacent level.

Further, the S4 includes:

when determining that a circle display request is received, establishing the radial multidimensional display graphs, in the form of center of a circle, corresponding to the total number of the levels;

determining the centers in the radial multidimensional display graphs as the centers of circles, establishing a plurality of concentric circles with different radii corresponding to the core documents and the non-core documents of different levels by using the centers of the circles as reference points, and taking the positions of the centers of the circles as the core display positions;

determining the number of the non-core documents at each of the concentric circles in the corresponding multidimensional display graph according to the number of the non-core documents with the document level information; and connecting the core documents in the centers of the circles to the corresponding non-core documents in the adjacent concentric circles, and connecting the non-core documents in the concentric circles to the corresponding non-core documents in the adjacent concentric circles.

Further, the connecting the core documents in the centers of the circles to the corresponding non-core documents in the adjacent concentric circles, and connecting the non-core documents in the concentric circles to the corresponding non-core documents in the adjacent concentric circles, includes:

acquiring the width of the radial multidimensional display graphs, and obtaining the display width of the radial multidimensional display graphs according to the reserved edge width;

acquiring the number of the concentric circles, obtaining the interval radius according to the display width and the number of the concentric circles, and sequentially obtaining a plurality of concentric circles corresponding to different document level information according to the interval radius;

acquiring the number of the non-core documents with the document level information corresponding to each of the concentric circles to obtain a first number, obtaining the interval length of any number of the non-core documents with the same document level information according to the perimeter of the corresponding concentric circle and the first number, and obtaining a display position of each of the non-core documents according to the interval length; and respectively connecting the corresponding core documents to the non-core documents and connecting the non-core documents to the non-core documents after all the core documents and non-core documents are respectively displayed in the radial multidimensional display graphs.

Further, the S5 includes:

generating the corresponding preset target images according to names of different first documents;

creating a plurality of sub-folders respectively in one-to-one correspondence with the preset target images in the first classified folder, and storing the corresponding first documents into the corresponding sub-folders;

generating a storage link path of each of the first documents according to a name of the first classified folder and names of the classified sub-folders; and performing real-time monitoring on the radial multidimensional display graphs, and after determining that any one of the preset target images is triggered, accessing the corresponding sub-folder according to the storage link path corresponding to the preset target image to call the corresponding first document.

Further, the method includes:

establishing an integrative calling path corresponding to each of the preset target images according to a connection relationship of the preset target images, the integrative calling path at least including a storage link path;

converting a calling mode of the first documents into an integrative calling mode after determining that a user triggers the radial multidimensional display graphs in the integrative calling mode; and when any one of the preset target images is triggered, calling at least one of the first documents according to the integrative calling mode corresponding to the preset target image to be displayed.

Further, the establishing an integrative calling path corresponding to each of the preset target images according to a connection relationship of the preset target images, the integrative calling path at least including a storage link path, includes:

determining the level information of the first document corresponding to each of the preset target images and the connection relationship in the triggered radial multidimensional display graph; and acquiring the storage link paths of all other first documents being directly or indirectly connected to the first document and having the document level information smaller than the document level information of the first document, and performing statistics on the storage link paths and the storage link path of the first document to obtain the integrative calling path.

The present disclosure has the following beneficial effects:

(1) In the present disclosure, the first classified folder will be obtained according to the document type information, such that each of the documents in the first classified folder belongs to a same project, and first classification of the documents is realized; then, the first classified folder is processed to obtain the second classified folder, and the core documents and the non-core documents are determined by means of the second classified folder, such that second classification of the documents is realized; next, the corresponding radial multidimensional display graphs are generated by means of the total number of the levels, the core documents are displayed according to the core positions, and the non-core documents are displayed according to the non-core positions, such that hierarchical and visual display of the documents is realized; and meanwhile, in this solution, the storage link paths corresponding to the preset target images displayed in the radial multidimensional display graphs are further established, such that the user may directly call the required documents on the basis of the radial multidimensional display graphs. In the whole process, the user does not need to open the folders one by one for search, such that the higher document calling efficiency is achieved.

(2) In the present disclosure, the radial multidimensional display graphs have two display modes, namely, a tree display mode and a concentric circle display mode, which may hierarchically and clearly display the levels of the documents and the abbreviated content of the documents. In addition, in this solution, during the tree display mode, the display size of the radial multidimensional display graphs in the length direction will be controlled in combination with the total number of the levels and the display length, such that the document information may be clearly displayed in the length direction; the display size of the radial multidimensional display graphs in the width direction will be controlled in combination with the number of the nodes of each level, such that the document information may be clearly displayed in the width direction; and in this solution, during the circle display mode, the optimal interval radius will be calculated in combination with the display width and the number of the concentric circles, the interval length is obtained in combination with the perimeter of the concentric circles and the first number to display the corresponding documents clearly and hierarchically.

(3) In the present disclosure, in order to facilitate the user to call the documents, two calling modes are designed, where one mode is that the user may click a preset target image to call a corresponding document; and the other mode is that when the user wants to call related documents in batches, the corresponding integrative calling path will be generated in this solution, and the required documents may be called in batches by means of the integrative calling mode on the basis of the integrative calling path, such that the document calling efficiency is improved.

BRIEF DESCRIPTION OF THE DRAWINGS

In order to more clearly describe the technical solution of the embodiments of the present disclosure, the accompanying drawings that need to be used in the description of the embodiments will be briefly introduced below. Apparently, the accompanying drawings in the description below only illustrate some embodiments of the present disclosure. Those of ordinary skill in the art may also derive other accompanying drawings from these accompanying drawings without creative efforts.

DETAILED DESCRIPTION

Figure 1:
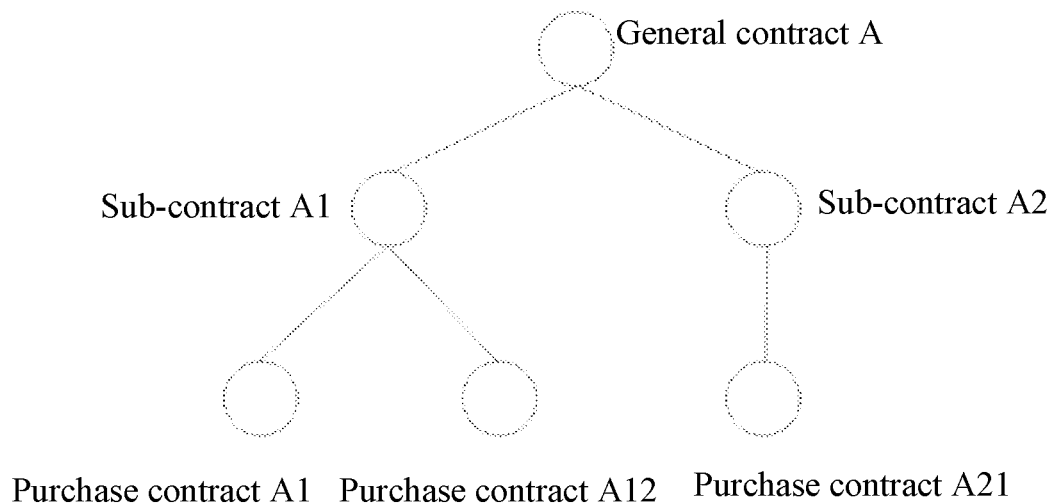
FIG. 1 is a schematic diagram of tree display provided by the present disclosure.

In order to make the content of the present disclosure easier to understand clearly, the present disclosure will be further described in detail below according to the specific implementations and in conjunction with the accompanying drawings.

First of all, the application scenarios of this solution are illustrated. In the context of power projects, there are often many contract documents. For example, a project includes a general contract, then the general contract further includes a plurality of sub-contracts correspondingly implementing various aspects of the project, and the sub-contracts further include purchase contracts for purchasing equipment required in the project, etc. These multidimensional contract documents will be processed in this solution.

The present disclosure provides a core data-based storage method for radial multidimensional documents, including Steps S1 to S5:

S1: acquiring a document dimension tag corresponding to each document, the document dimension tag at least including document type information and document level information.

Each document in this solution has the corresponding document dimension tag, where the document dimension tag includes the document type information and the document level information. The document type information and the document level information are illustrated by means of the examples as described below in this solution.

Exemplarily, for a project A and a project B, the project A includes a general contract A, a sub-contract A, and a purchase contract A, and the project B includes a general contract B, a sub-contract B, and a purchase contract B.

If the projects to which the general contract A and the general contract B belong are different, then the corresponding document type information is also different. The general contract A, the sub-contract A, and the purchase contract A are used in the same project, but the corresponding document level information is different. For example, the general contract A has a level of 3, the sub-contract A has a level of 2, and the purchase contract A has a level of 1. The document dimension tag for each document will be created in the above way in this solution.

S2: classifying first documents with the same document type information into a preset folder to obtain a first classified folder, and sorting all the first documents in the first classified folder in descending order according to the document level information to obtain a second classified folder after an update of the first classified folder.

In this solution, the first classified folder will be obtained according to the document type information. The first classified folder includes, for example, {sub-contract A, general contract A, purchase contract A}, or {purchase contract B, sub-contract B, general contract B}. That is to say, the document type information of all the documents in the first classified folder is same.

In addition, in this solution, all the first documents in the first classified folder will be sorted in descending order according to the document level information to obtain the second classified folder, such that the earlier the documents is sorted, the higher the corresponding document level information is. This solution is illustrated with the highest level of the general contract, the medium level of the sub-contract, and the lowest level of the purchase contract. If the document level information is, for example, 3, 2, and 1, then the general contract may correspond to 3, the sub-contract may correspond to 2, and the purchase contract may correspond to 1.

For example, when the first classified folder is {sub-contract A, general contract A, purchase contract A}, the obtained second classified folder is {general contract A, sub-contract A, purchase contract A}; and when the first classified folder is {purchase contract B, sub-contract B, general contract B}, the obtained second classified folder is {general contract B, sub-contract B, purchase contract B}.

In some embodiments, the S2 includes S21 to S24:

S21: acquiring information of all document types of all documents, and respectively establishing the preset folder corresponding to the information of each document type.

For example, if the documents include {sub-contract A, general contract A, purchase contract A, purchase contract B, sub-contract B, general contract B}, then there are two pieces of the document type information A and B, and there may be two corresponding preset folders.

S22: classifying the documents with the document type information corresponding to the preset folder into the preset folder, and obtaining the corresponding first classified folder after determining that all the documents with the same document type information are classified into the preset folder.

In this solution, there may be two first classified folders after classification, which are respectively {sub-contract A, general contract A, purchase contract A} and {purchase contract B, sub-contract B, general contract B}.

S23: acquiring the document level information of all the first documents in the first classified folder, where the higher the document level information is, the more important and core the corresponding first document is.

This solution is illustrated with the highest level of the general contract, the medium level of the sub-contract, and the lowest level of the purchase contract. If the document level information is, for example, 3, 2, and 1, then the general contract may correspond to 3, the sub-contract may correspond to 2, and the purchase contract may correspond to 1.

S24: sorting all the first documents in descending order according to the document level information of the first documents to obtain the second classified folder after the update of the first classified folder.

For example, when the first classified folder is {sub-contract A, general contract A, purchase contract A}, the obtained second classified folder is {general contract A, sub-contract A, purchase contract A}; and when the first classified folder is {purchase contract B, sub-contract B, general contract B}, the obtained second classified folder is {general contract B, sub-contract B, purchase contract B}.

S3: determining at least one core document according to a first one of the first documents in the second classified folder, taking other ones of the first documents in the second classified folder as non-core documents, and acquiring the total number of levels of the document level information of all the non-core documents.

In this solution, the at least one core document will be determined according to the first one of the first documents in the second classified folder, then the other ones of the first documents in the second classified folder are taken as the non-core documents, and the total number of the levels of the document level information of all the non-core documents is acquired.

For example, if the second classified folder is {general contract A, sub-contract A, purchase contract A}, then the general contract A is the core document, the sub-contract A and the purchase contract A are the non-core documents, and the total number of the levels of the document level information of all the corresponding non-core documents is two.

In some embodiments, the S3 includes S31 to S33:

S31: taking the first one of the first documents in the second classified folder as the core document, and taking the document level information corresponding to the core document as highest level information.

For example, if the second classified folder is {general contract A1, general contract A2, sub-contract A, purchase contract A}, then the general contract A1 is the core document. If the corresponding document level information is 3, then the highest level information is 3.

S32: taking other ones of the first documents with the same highest level information as the core documents.

For example, if the second classified folder is {general contract A1, general contract A2, sub-contract A, purchase contract A}, then the document level information corresponding to the general contract A2 is also 3, and the general contract A2 is also taken as the core document in this solution. In other words, there two core documents in this solution, which are respectively the general contract A1 and the general contract A2.

S33: taking other ones of the first documents with the level information different from the highest level information as the non-core documents, and performing statistics on the total number of all the document levels of all the non-core documents.

For example, the sub-contract A (level of 2) and the purchase contract A (level of 1) are the non-core documents, and the total number of corresponding levels is two.

S4: establishing radial multidimensional display graphs corresponding to the second classified folder according to the total number of the levels, placing the core documents in core display positions of the radial multidimensional display graphs, and determining a non-core display position of each of the non-core documents in the radial multidimensional display graphs according to the document level information of the non-core document.

In this solution, the radial multidimensional display graphs corresponding to the second classified folder will be established to clearly display the documents.

It should be noted that this solution includes two display modes, specifically as follows:

Referring to FIG. 1 for a display mode 1. In some embodiments, the S4 includes A1 to A4:

A1: when determining that a tree display request is received, establishing the radial multidimensional display graphs, in the form of a tree, corresponding to the total number of the levels, the number of dimensions of nodes in the radial multidimensional display graphs corresponding to the total number of the levels of the core documents and the non-core documents.

In this embodiment, the display mode is tree display. If the tree display request is received, then the radial multidimensional display graphs, in the form of the tree, corresponding to the total number of the levels are established, and the number of the dimensions of the nodes in the radial multidimensional display graphs corresponds to the total number of the levels of the core documents and the non-core documents.

A2: determining the number of root nodes in the radial multidimensional display graphs according to the number of the core documents, and taking the root nodes as the core display positions.

Exemplarily, the second classified folder is {general contract A, sub-contract A1, sub-contract A2, purchase contract A11, purchase contract A12, purchase contract A21}, where if there is only one core document, then there is only one root node that is the core display position.

A3: determining the number of sub-nodes of each level in the corresponding multidimensional display graph according to the number of the non-core documents with the document level information, and taking the sub-nodes as the display positions of the non-core documents.

Exemplarily, the second classified folder is {general contract A, sub-contract A1, sub-contract A2, purchase contract A11, purchase contract A12, purchase contract A21}, where if there are two non-core documents with the document level information of 2 and three non-core documents with the document level of 1, then there are two sub-nodes with the corresponding document level information of 2 and three sub-nodes with the corresponding document level information of 1. In this solution, the sub-nodes are all the display positions of the non-core documents.

A4: connecting all the root nodes to the corresponding sub-nodes, and connecting the sub-nodes of a different level to the sub-nodes of an adjacent level, the levels of the sub-nodes corresponding to the document level information.

In this solution, after the root nodes and the sub-nodes are determined, connection will be established to form a tree display structure, where the levels of the sub-nodes correspond to the document level information.

In some embodiments, Step A4 (the connecting all the root nodes to the corresponding sub-nodes, and connecting the sub-nodes of a different level to the sub-nodes of an adjacent level, the levels of the sub-nodes corresponding to the document level information) includes A41 to A44:

A41: acquiring the length and width of the radial multidimensional display graphs, and obtaining the display length and display width of the radial multidimensional display graphs according to the reserved edge length and the reserved edge width.

It may be understood that in this solution, the display size of the radial multidimensional display graphs will be adjusted to be optimal.

If the length is, for example, 10 cm, the width is, for example, 14 cm, the reserved edge length is, for example, 1 cm, and the reserved edge width is, for example, 2 cm, then the corresponding display length and display width of the radial multidimensional display graphs are 9 cm and 12 cm.

It may be understood that the radial multidimensional display graphs in this solution will perform display within a range of 9 cm*12 cm.

A42: dividing the display length by the total number of the levels to obtain a length interval distance, and controlling the nodes of the adjacent level to be spaced according to the length interval distance in a length direction.

For example, if the total number of corresponding levels is three, then the display length is 9 cm divided by 3; and if the obtained length interval distance is 3 cm, then an interval between the nodes of adjacent levels in the length direction is 3 cm.

In the above way, the radial multidimensional display graphs may be controlled to clearly display the document information by adaption to the total number of the levels in the length direction.

A43: performing statistics on the number of the nodes corresponding to each level to obtain the total number of the nodes, dividing the display width by the number of the nodes to obtain a width interval distance, and controlling the adjacent nodes of the same level to be spaced according to the width interval distance.

For example, if the number of the nodes with the corresponding document level information of 1 is three, then the display width is divided by 3; and if the obtained width interval distance is 4 cm, then the nodes of adjacent levels are displayed at the interval of 4 cm in the length direction.

In the above way, the radial multidimensional display graphs may be controlled to clearly display the document information by adaption to the number of the nodes of each level in the width direction.

A44: connecting the root nodes to the corresponding sub-nodes, and connecting the sub-nodes of the different level to the sub-nodes of the adjacent level.

It may be understood that in this solution, after a transverse distance and a vertical distance of each node are determined, the root nodes may be connected to the corresponding sub-nodes, and the sub-nodes of the different level may be connected to the sub-nodes of the adjacent level to form the display mode of a tree graph.

Figure 2:
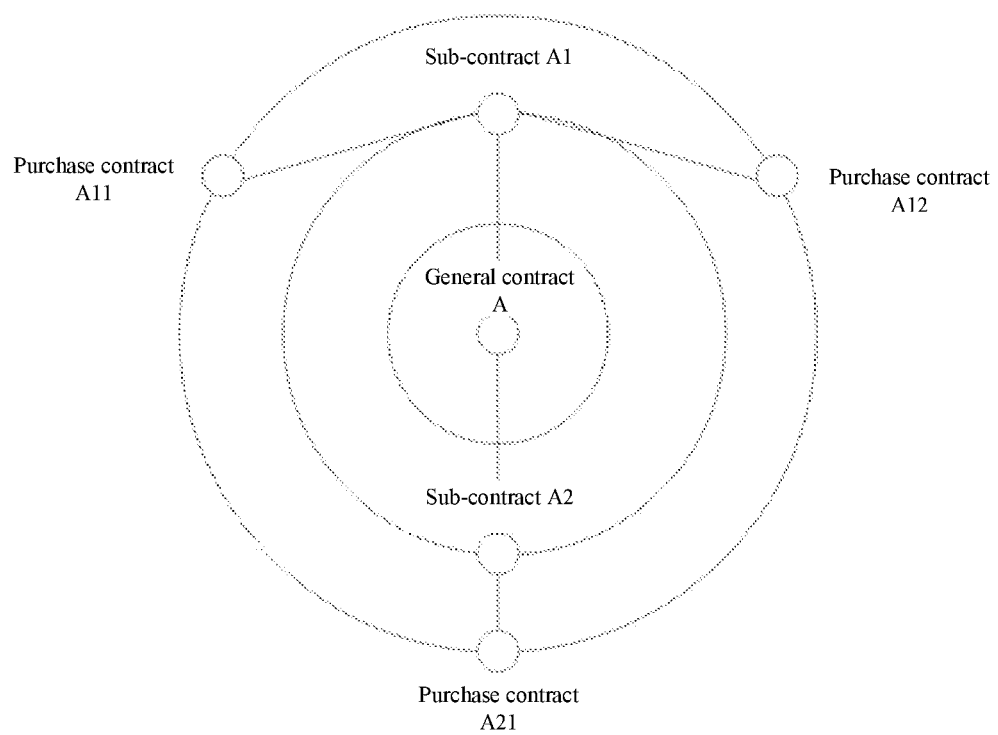
FIG. 2 is a schematic diagram of circle display provided by the present disclosure.

Seeing FIG. 2 for a display mode 2. In some embodiments, the S4 includes B1 to B4:

B1: when determining that a circle display request is received, establishing the radial multidimensional display graphs, in the form of center of a circle, corresponding to the total number of the levels.

In this embodiment, the display mode is circle display of concentric circles. If the circle display request is received, then the radial multidimensional display graphs, in the form of the center of the circle, corresponding to the total number of the levels are established.

B2: determining the centers in the radial multidimensional display graphs as the centers of circles, establishing a plurality of concentric circles with different radii corresponding to the core documents and the non-core documents of different levels by using the centers of the circles as reference points, and taking the positions of the centers of the circles as the core display positions.

It may be understood that the centers of the circles corresponds to the core display positions, which are used to display the core documents, and the plurality of concentric circles with the different radii corresponding to the non-core documents of the different levels, for example, have three levels. There will be three concentric circles with different radii in this solution.

B3: determining the number of the non-core documents at each of the concentric circles in the corresponding multidimensional display graph according to the number of the non-core documents with the document level information.

For example, the number of the non-core documents with the corresponding document level information of 2 is two, and the number of the non-core documents with the corresponding document level information of 1 is three.

B4: connecting the core documents in the centers of the circles to the corresponding non-core documents in the adjacent concentric circles, and connecting the non-core documents in the concentric circles to the corresponding non-core documents in the adjacent concentric circles.

Meanwhile, the documents between the concentric circles will be connected in this solution.

In some embodiments, B4 (the connecting the core documents in the centers of the circles to the corresponding non-core documents in the adjacent concentric circles, and connecting the non-core documents in the concentric circles to the corresponding non-core documents in the adjacent concentric circles) includes B41 to B44:

B41: acquiring the width of the radial multidimensional display graphs, and obtaining the display width of the radial multidimensional display graphs according to the reserved edge width.

In this solution, the display size of the radial multidimensional display graphs will be adjusted to make the display size of the document information optimal.

If the width is, for example, 14 cm and the reserved edge width is, for example, 2 cm, then the corresponding display width of the radial multidimensional display graphs is 12 cm.

It may be understood that since the documents are displayed in the form of the concentric circles in this solution, only data of the display width needs to be acquired.

B42: acquiring the number of the concentric circles, obtaining the interval radius according to the display width and the number of the concentric circles, and sequentially obtaining a plurality of concentric circles corresponding to different document level information according to the interval radius.

Exemplarily, if the number of the concentric circles is three and the display width is 12 cm, then the corresponding interval radius is 4 cm. In this solution, the three concentric circles corresponding to the different document level information will be sequentially obtained according to 4 cm.

B43: acquiring the number of the non-core documents with the document level information corresponding to each of the concentric circles to obtain a first number, obtaining the interval length of any number of the non-core documents with the same document level information according to the perimeter of the corresponding concentric circle and the first number, and obtaining a display position of each of the non-core documents according to the interval length.

Exemplarily, if the first number with the corresponding document level information of 1 is three, then the perimeter of the corresponding concentric circle is 12 cm divided by 3. If the obtained interval length is 4 cm, then the display position of each of the non-core documents will be obtained according to the interval length of 4 cm.

B44: respectively connecting the corresponding core documents to the non-core documents and connecting the non-core documents to the non-core documents after all the core documents and non-core documents are respectively displayed in the radial multidimensional display graphs.

It may be understood that the corresponding core documents and non-core documents will be connected to form circle display graphs.

Figure 3:
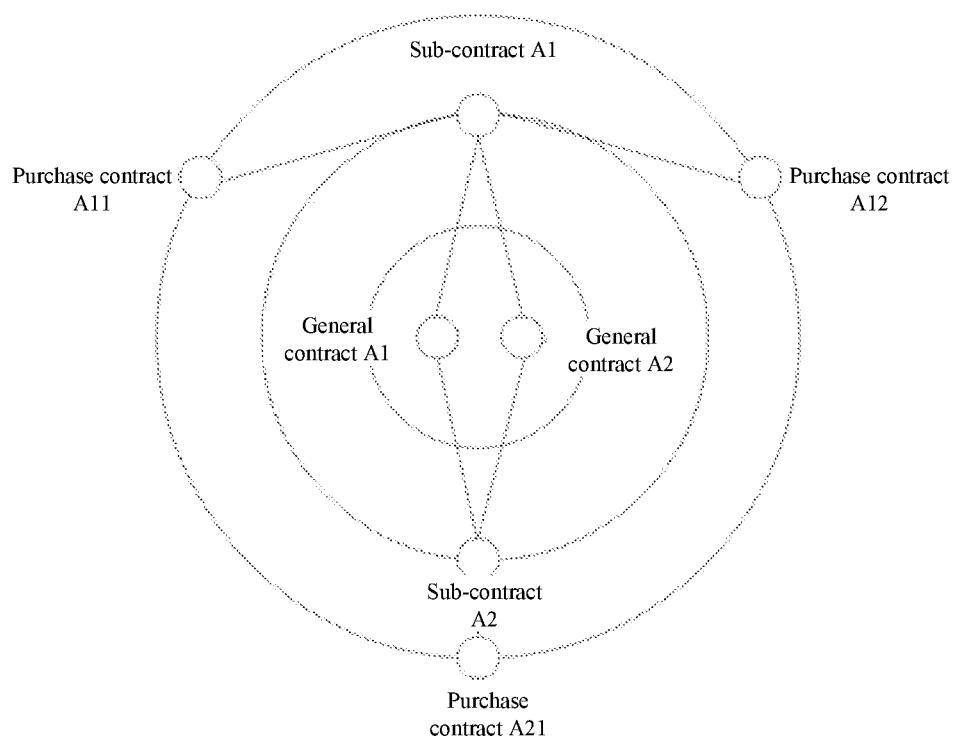
FIG. 3 is a schematic diagram of another circle display provided by the present disclosure.

Referring to FIG. 3 that is another circle display mode provided by the present disclosure, in some scenarios, for example, the general contract A2 as a supplementary agreement is signed in the general contract A1. In this case, there will be two general contracts, and then there will be two core documents in the core document positions, which are respectively the general contract A1 and the general contract A2.

S5: displaying preset target images at the core display positions and/or the non-core display positions, setting a corresponding storage link path for each of the displayed preset target images, and after determining that the preset target images at the core display positions and/or the non-core display positions are triggered, accessing the corresponding target folders on the basis of the storage link paths to call the corresponding first documents.

It may be understood that the classification and display of the multidimensional documents are realized in Steps S1 to S4, and the first documents will be called in Step S5.

It may also be understood that the displayed preset target images are set in this solution. For example, for the general contract A, the corresponding displayed preset target image may be a graphic text corresponding to the general contract A, or other forms of images that can display the general contract A.

In this solution, the corresponding storage link path is set for each of the displayed preset target images. When the user wants to look up or call the general contract A, the user can access the corresponding target folders according to the storage link paths only by triggering the preset target images at the core display positions and/or the non-core display positions to call the corresponding first documents.

In some embodiments, the S5 includes S51 to S54:

S51: generating the corresponding preset target images according to names of different first documents.

For example, for the general contract A, the corresponding displayed preset target image may be the graphic text corresponding to the general contract A, or other forms of the images that can display the general contract A.

S52: creating a plurality of sub-folders respectively in one-to-one correspondence with the preset target images in the first classified folder, and storing the corresponding first documents into the corresponding sub-folders.

It may be understood that the first classified folder in this solution includes the plurality of sub-folders, and each of the first documents is stored in the corresponding sub-folder.

S53: generating a storage link path of each of the first documents according to a name of the first classified folder and names of the classified sub-folders.

Exemplarily, if the first document A is stored in the sub-folder A11 of the first classified folder A1, then the storage link path of the first document is A1-A11.

S54: performing real-time monitoring on the radial multidimensional display graphs, and after determining that any one of the preset target images is triggered, accessing the corresponding sub-folder according to the storage link path corresponding to the preset target image to call the corresponding first document.

In this solution, after the preset target image is triggered, the corresponding sub-folder will be accessed according to the storage link path corresponding to the preset target image to call the corresponding first document.

On the basis of the above embodiment, this solution further provides a different calling mode according to the need of a user, including C1 to C3:

C1: establishing an integrative calling path corresponding to each of the preset target images according to a connection relationship of the preset target images, the integrative calling path at least including a storage link path.

This solution takes into account that if the user needs more documents in a project, the calling efficiency of one-by-one clicking is too low, and the time of the user is wasted. Therefore, in this solution, the integrative calling path corresponding to each preset target image will be established by means of the connection relationship of the preset target images to integrate the corresponding documents together, and then the user may call a series of documents by one click, which improves the document calling efficiency.

In some embodiments, C1 (the establishing an integrative calling path corresponding to each of the preset target images according to a connection relationship of the preset target images, the integrative calling path at least including a storage link path) includes:

determining the level information of the first document corresponding to each of the preset target images and the connection relationship in the triggered radial multidimensional display graph. It may be understood that related information, including the level information of the corresponding first document and the connection relationship in the triggered radial multidimensional display graph, of each of the preset target images will be determined first.

acquiring the storage link paths of all other first documents being directly or indirectly connected to the first document and having the document level information smaller than the document level information of the first document, and performing statistics on the storage link paths and the storage link path of the first document to obtain the integrative calling path.

Exemplarily, referring to FIG. 1, by taking the sub-contract A1 in FIG. 1 as an example, if the document level information is 2, then the storage link paths of all other first documents being directly or indirectly connected to the first document and having the document level information smaller than the document level information (2) of the first document are the storage paths of the purchase contract A11, the purchase contract A12, and the purchase contract A21, and the integrative calling path is formed according to the above paths and the storage link path of the first document.

C2: converting a calling mode of the first documents into an integrative calling mode after determining that a user triggers the radial multidimensional display graphs in the integrative calling mode.

It may be understood that the integrative calling mode in this solution may be used for the user to select. If the user selects the integrative calling mode, then the documents will be called in batches by means of the corresponding integrative calling path.

C3: when any one of the preset target images is triggered, calling at least one of the first documents according to the integrative calling mode corresponding to the preset target image to be displayed.

For example, the user may click on the preset target image of the sub-contract A1, and then the corresponding integrative calling paths are the storage paths of the sub-contract A1, the purchase contract A11, the purchase contract A12, and the purchase contract A21.

Through the above-mentioned implementations, this solution may allow the user to call the required documents in batches, which improves the document calling efficiency, and enhances the user experience.

In addition to the above-mentioned embodiments, the present disclosure may also have other embodiments; and the technical solutions formed by means of equivalent substitutions or equivalent modifications fall within the scope of protection of the present disclosure.

What is claimed is:

1. A core data-based storage method for radial multidimensional documents, comprising:
    (1) acquiring a document dimension tag corresponding to each document, the document dimension tag at least comprising document type information and document level information;
    (2) classifying first documents with the same document type information into a preset folder to obtain a first classified folder, and sorting all the first documents in the first classified folder in descending order according to the document level information to obtain a second classified folder after an update of the first classified folder;
    (3) determining at least one core document according to a first one of the first documents in the second classified folder, taking other ones of the first documents in the second classified folder as non-core documents, and acquiring the total number of levels of the document level information of all the non-core documents;
    (4) establishing radial multidimensional display graphs corresponding to the second classified folder according to the total number of the levels, placing the core documents in core display positions of the radial multidimensional display graphs, and determining a non-core display position of each of the non-core documents in the radial multidimensional display graphs according to the document level information of the non-core document; and
    (5) displaying preset target images at the core display positions and/or the non-core display positions, setting a corresponding storage link path for each of the displayed preset target images, and after determining that the preset target images at the core display positions and/or the non-core display positions are triggered, accessing the corresponding target folders on the basis of the storage link paths to call the corresponding first documents,
    wherein the (4) establishing comprises:
        when determining that a circle display request is received, establishing the radial multidimensional display graphs, in the form of center of a circle, corresponding to the total number of the levels;
        determining the centers in the radial multidimensional display graphs as the centers of circles, establishing a plurality of concentric circles with different radii corresponding to the core documents and the non-core documents of different levels by using the centers of the circles as reference points, and taking the positions of the centers of the circles as the core display positions;
        determining the number of the non-core documents at each of the concentric circles in the corresponding multidimensional display graph according to the number of the non-core documents with the document level information; and
        connecting the core documents in the centers of the circles to the corresponding non-core documents in the adjacent concentric circles, and connecting the non-core documents in the concentric circles to the corresponding non-core documents in the adjacent concentric circles,
    wherein the connecting of the core documents and the connecting of the non-core documents comprise:
        acquiring the width of the radial multidimensional display graphs, and obtaining the display width of the radial multidimensional display graphs according to the reserved edge width;
        acquiring the number of the concentric circles, obtaining the interval radius according to the display width and the number of the concentric circles, and sequentially obtaining a plurality of concentric circles corresponding to different document level information according to the interval radius;
        acquiring the number of the non-core documents with the document level information corresponding to each of the concentric circles to obtain a first number, obtaining the interval length of any number of the non-core documents with the same document level information according to the perimeter of the corresponding concentric circle and the first number, and obtaining a display position of each of the non-core documents according to the interval length; and
        respectively connecting the corresponding core documents to the non-core documents and connecting the non-core documents to the non-core documents after all the core documents and non-core documents are respectively displayed in the radial multidimensional display graphs; and the (5) displaying comprises:
  generating the corresponding preset target images according to names of different first documents;
  creating a plurality of sub-folders respectively in one-to-one correspondence with the preset target images in the first classified folder, and storing the corresponding first documents into the corresponding sub-folders;
  generating a storage link path of each of the first documents according to a name of the first classified folder and names of the classified sub-folders; and
  performing real-time monitoring on the radial multidimensional display graphs, and after determining that any one of the preset target images is triggered, accessing the corresponding sub-folder according to the storage link path corresponding to the preset target image to call the corresponding first document, the method further comprises:

(6) establishing an integrative calling path corresponding to each of the preset target images according to a connection relationship of the preset target images, the integrative calling path at least comprising a storage link path;

(7) converting a calling mode of the first documents into an integrative calling mode after determining that a user triggers the radial multidimensional display graphs in the integrative calling mode; and (8) when any one of the preset target images is triggered, calling at least one of the first documents according to the integrative calling mode corresponding to the preset target image to be displayed, wherein the (6) establishing comprises:
  determining the level information of the first document corresponding to each of the preset target images and the connection relationship in the triggered radial multidimensional display graph; and
  acquiring the storage link paths of all other first documents being directly or indirectly connected to the first document and having the document level information smaller than the document level information of the first document, and performing statistics on the storage link paths and the storage link path of the first document to obtain the integrative calling path.

2. The core data-based storage method according to claim 1, wherein the (2) classifying comprises:
  acquiring information of all document types of all documents, and respectively establishing the preset folder corresponding to the information of each document type;
  classifying the documents with the document type information corresponding to the preset folder into the preset folder, and obtaining the corresponding first classified folder after determining that all the documents with the same document type information are classified into the preset folder;
  acquiring the document level information of all the first documents in the first classified folder; and
  sorting all the first documents in descending order according to the document level information of the first documents to obtain the second classified folder after the update of the first classified folder.

3. The core data-based storage method according to claim 1, wherein the (3) displaying comprises:
  taking the first one of the first documents in the second classified folder as the core document, and taking the document level information corresponding to the core document as highest level information;
  taking other ones of the first documents with the same highest level information as the core documents; and
  taking other ones of the first documents with the level information different from the highest level information as the non-core documents, and performing statistics on the total number of all the document levels of all the non-core documents.

4. The core data-based storage method according to claim 3, wherein
  the (4) establishing comprises:
  when determining that a tree display request is received, establishing the radial multidimensional display graphs, in the form of a tree, corresponding to the total number of the levels;
  determining the number of root nodes in the radial multidimensional display graphs according to the number of the core documents, and taking the root nodes as the core display positions;
  determining the number of sub-nodes of each level in the corresponding multidimensional display graph according to the number of the non-core documents with the document level information, and taking the sub-nodes as the display positions of the non-core documents; and
  connecting all the root nodes to the corresponding sub-nodes, and connecting the sub-nodes of a different level to the sub-nodes of an adjacent level, the levels of the sub-nodes corresponding to the document level information.

5. The core data-based storage method according to claim 4, wherein the connecting of all the root nodes and the connecting of the sub-nodes comprise:
  acquiring the length and width of the radial multidimensional display graphs, and obtaining the display length and display width of the radial multidimensional display graphs according to the reserved edge length and the reserved edge width;
  dividing the display length by the total number of the levels to obtain a length interval distance, and controlling the nodes of the adjacent level to be spaced according to the length interval distance in a length direction;
  performing statistics on the number of the nodes corresponding to each level to obtain the total number of the nodes, dividing the display width by the number of the nodes to obtain a width interval distance, and controlling the adjacent nodes of the same level to be spaced according to the width interval distance; and
  connecting the root nodes to the corresponding sub-nodes, and connecting the sub-nodes of the different level to the sub-nodes of the adjacent level.

* * * * *